United States Patent
Lu et al.

(10) Patent No.: US 10,197,749 B2
(45) Date of Patent: Feb. 5, 2019

(54) BOSA DEVICE HAVING ADJUSTABLE WAVELENGTH IN TWO DIRECTIONS

(71) Applicant: Accelink Technologies Co., Ltd., Wuhan (CN)

(72) Inventors: Yaping Lu, Wuhan (CN); Zhenfeng Xue, Wuhan (CN); Yongan Fu, Wuhan (CN); Liping Sun, Wuhan (CN); Jun Zhang, Wuhan (CN); Lijuan Wang, Wuhan (CN); Wenjuan He, Wuhan (CN)

(73) Assignee: Accelink Technologies Co., Ltd. (CN)

( * ) Notice: Subject to any disclaimer, the term of this patent is extended or adjusted under 35 U.S.C. 154(b) by 0 days.

(21) Appl. No.: 15/772,437

(22) PCT Filed: Dec. 18, 2015

(86) PCT No.: PCT/CN2015/097824
§ 371 (c)(1),
(2) Date: Apr. 30, 2018

(87) PCT Pub. No.: WO2017/071021
PCT Pub. Date: May 4, 2017

(65) Prior Publication Data
US 2018/0329160 A1 Nov. 15, 2018

(30) Foreign Application Priority Data
Oct. 30, 2015 (CN) .......................... 2015 1 0718826

(51) Int. Cl.
*H04B 10/00* (2013.01)
*G02B 6/42* (2006.01)
(Continued)

(52) U.S. Cl.
CPC ......... *G02B 6/4215* (2013.01); *G02B 6/2817* (2013.01); *G02B 6/4246* (2013.01); *H04B 10/40* (2013.01)

(58) Field of Classification Search
CPC ........ H04B 10/40; H04B 10/43; H04B 10/50; H04B 10/60
See application file for complete search history.

(56) References Cited

U.S. PATENT DOCUMENTS

2015/0245114 A1* 8/2015 Ho ........................ H04B 10/079
398/34
2015/0311976 A1* 10/2015 Ishizaka ............. H04B 10/2503
398/38

FOREIGN PATENT DOCUMENTS

CN 2550785 Y 5/2003
CN 202077033 U 12/2011
(Continued)

OTHER PUBLICATIONS

International Search Report for Applicarion No. PCT/CN2015/097824 dated Jul. 26, 2016, 2 pages.

*Primary Examiner* — Daniel Dobson
(74) *Attorney, Agent, or Firm* — Lerner, David, Littenberg, Krumholz & Mentlik, LLP

(57) ABSTRACT

A BOSA device having an adjustable wavelength in two directions comprises a signal transmitter section and a signal receiver section, wherein the signal transmitter section sequentially includes a laser (1-1), a semiconductor optical amplifier (SOA) (3-1), a splitter (4-1), a data upload and download port (5-1), and a first TEC temperature control module (9-1) to control temperature of the laser (1-1) so as to adjust its output wavelength, and the signal receiver section sequentially includes a filter (7-1), a photo detector (8-1), and a receiving end driving device to change an angle of the filter (7-1) with respect to the optical path so as to (Continued)

make a passing wavelength of the filter adjustable. The first TEC temperature control module (9-1) controls temperature of the laser (1-1), and the receiving end driving device drives the filter (7-1) to change an angle of the filter with respect to the optical path.

9 Claims, 3 Drawing Sheets

(51) Int. Cl.
*G02B 6/28* (2006.01)
*H04B 10/40* (2013.01)
*H04J 14/00* (2006.01)

(56) References Cited

FOREIGN PATENT DOCUMENTS

| | | |
|---|---|---|
| CN | 102725669 A | 10/2012 |
| CN | 103033493 A | 4/2013 |
| CN | 203522748 U | 4/2014 |
| CN | 104618029 B | 5/2017 |
| WO | 2005036239 A2 | 4/2005 |

\* cited by examiner

BOSA DEVICE HAVING ADJUSTABLE WAVELENGTH IN TWO DIRECTIONS

CROSS REFERENCE TO RELATED APPLICATIONS

The present application is a national phase entry under 35 U.S.C. § 371 of International Application No. PCT/CN2015/097824, filed Dec. 18, 2015, which claims priority from Chinese Patent Application No. 201510718826.6 filed Oct. 30, 2015, all of which are hereby incorporated herein by reference.

TECHNICAL FIELD OF THE DISCLOSURE

The present invention relates to the field of optical communication and, more particularly, to a bidirectional optical sub-assembly (BOSA) device having an adjustable wavelength in two directions.

BACKGROUND

The demand for information transmission bandwidth has been explosively growing in recent years. To meet needs of increasing network traffic, 40 Gbps and 100 Gbps optical communication networks have been deployed commercially in backbone networks, and 400 Gbps and 1 Tbps optical communication systems are being studied. On the access network side, higher requirements are also proposed for network traffic and multi-service support capabilities. At present, the access network generally employs a passive optical network (PON) with a tree structure, especially a time division multiplexing passive optical network (TDM-PON). Ethernet passive optical network (EPON) and gigabit-capable passive optical network (GPON) technologies are mostly used in the current fiber to the home (FTTH) network construction. However, they cannot meet the demand of the access network for higher data rate any longer. As such, the next generation of PON (NG-PON) technology has drawn much attention in the industry. It is generally believed in the industry that evolution of the NG-PON technology involves the following three aspects: 1. increasing data rate of a single wavelength; 2. wavelength division multiplexing; and 3. orthogonal frequency division multiplexing.

Each of the three solutions can effectively solve the problem of bandwidth bottleneck in the future, but they also have their own problems to be solved. For example, the first solution of increasing data rate of the single wavelength will inevitably lead to greater dispersion, and the third solution of orthogonal frequency division multiplexing puts forward new requirements on digital signal processing (DSP). In contrast, the second solution of wavelength division multiplexing is relatively easy to implement, with lower technical barriers, and relatively lower cost. For this reason, the full service access networks (FSAN) summit specified time and wavelength division multiplexed passive optical network (TWDM-PON) as the ultimate solution for the next generation of PON products in April 2012. However, even TWDM-PON also has its own technical problems to be solved. For example, an optical network unit (ONU) module must have wavelength-adjustable transmitting and receiving functions. That is, both the optical wavelength of the transmitting section and the optical wavelength of the receiving section have to be adjustable. In other words, the ONU module needs to integrate a bi-directional optical sub-assembly (BOSA) having an adjustable wavelength in both directions.

Currently, the wavelength-adjustable transmitter and the wavelength-adjustable receiver, as commonly used devices in optical communication, have been intensively studied. However, they often have a simple function and cannot adjust the wavelength at the transmitting side and the receiving side concurrently, so they cannot meet requirements of the TWDM-PON network.

PCT Patent Application No. WO2005036239A2 entitled "TUNABLE FILTER MEMBRANE STRUCTURES AND METHOD OF MAKING" discloses a filter medium membrane formed by deposition, and it adjusts wavelength by heating multiple films. This approach is hard to implement and greatly depends on the manufacture apparatus so that it is not easy for mass production. In addition, it cannot realize wavelength adjustment in two directions and thus cannot meet the requirements of the TWDM-PON network.

Chinese Patent Application No. 201410794542.0 entitled "ADJUSTABLE OPTICAL RECEIVER AND ITS ADJUSTABLE FILTER USED IN TWDM-PON SYSTEM" discloses a F-P cavity filtering etalon assembly formed by combining two or more F-P cavity filtering etalons having the same free space spectrum width, and temperature of the F-P cavity etalons may be controlled to adjust length of the F-P cavity and thus the filtering wavelength. This solution has advantages such as a simple structure, easy controlling, and good filtering effect, but it cannot realize optical signal transmitting and can only be used as a receiver. In this regard, it has a simple function and cannot meet the requirements of the TWDM-PON network.

There are many simple optical signal transmitter devices in the market, such as distributed feedback lasers (DFBs) and electro-absorption modulated lasers (EMLs), which are of various types and have different performance. For a particular device, however, it has a limited range of optical transmitting power adjustment, and can only be used as a transmitter. They have a simple function and cannot meet the requirements of the TWDM-PON network.

SUMMARY

In order to solve the above problems, the present invention provides a BOSA device having adjustable wavelengths at both the receiving end and the transmitting end comprising a laser, a semiconductor optical amplifier (SOA), a splitter, a data upload and download port, a first TEC temperature control module, a filtering device, and a receiving end driving device. The present invention integrates signal transmitting and receiving into a single device by using mature devices such as the laser, the SOA, the splitter, the filtering device and the like that, which has advantages such as powerful functions, small size, high degree of integration, better scalability, low cost and the like. Such a device may improve performance of the entire network when it is used in the TWDM-PON network, and has broad application prospects.

The present invention includes following technical solutions:

A BOSA device having an adjustable wavelength in two directions comprising a signal transmitter section and a signal receiver section, the signal transmitter section sequentially including a laser, a semiconductor optical amplifier (SOA) configured to amplify a light beam from the laser, a splitter configured to transmit the light beam from the laser and to reflect light from external network to an optical path of the receiving end, and a data upload and download port configured to extract the optical signal from the transmitting end to the external network so as to realize signal upload and to introduce the signal from the external network into the receiving end so as to realize signal download, and the signal transmitter section further including a first TEC temperature control module configured to control temperature of the laser so as to adjust an output wavelength of the laser, and the signal receiver section sequentially including a filter configured to select a wavelength from the optical signal introduced from the external network into the receiving end, and a photo detector configured to convert the received optical signal into an electric signal for subsequent analysis and processing, and the signal receiver section further including a receiving end driving device configured to drive the filter so as to make filtering wavelengths of the filter adjustable.

In some embodiments, the signal transmitter section may further sequentially include a built-in lens to convert a divergent light from the laser into a parallel light and a first focusing lens to convert the parallel light into a convergent light located between the laser and the SOA, and a first collimating lens to convert a divergent light from the SOA into a parallel light and a second focusing lens configured to convert the parallel light into a convergent light located between the SOA and the splitter, and the signal transmitter section may further include a transmitting end driving device, the signal receiver section may further sequentially include a second collimating lens located between the splitter and the filter to convert the divergent multi-wavelength light downloaded from the external network reflected by the splitter into a parallel light, and a mirror to change a direction of the parallel light.

In some embodiments, the signal transmitter section may further include a second TEC temperature control module configured to control temperature of the SOA under a nominal temperature to ensure output stability.

In some embodiments, the transmitting end driving device may include a first driving control element configured to drive the laser and a second driving control element configured to drive the SOA, the first driving control element may adjust magnitude of a bias current for the laser so as to adjust optical output power of the laser, and the second driving control element may adjust magnitude of a bias current for the SOA so as to adjust a gain of the SOA.

In some embodiments, the receiving end driving device may include a micro-motor and a rotary plate connected at its center to a shaft of the micro-motor, the filter is attached to the rotary plate so that when the shaft of the micro-motor rotates, the rotary plate and the filter attached thereto also rotates.

In some embodiments, the receiving end driving device may include a MEMS chip having a rotary pole bonded to the filter so that when the MEMS chip is driven, the rotary pole rotates the filter.

In some embodiments, the laser provides an output light in a band of 1550 nm, the SOA has an operation wavelength in the band of 1550 nm, and the splitter transmits light in the band of 1550 nm and reflects light in a band of 1610 nm.

In some embodiments, the filter is a 100G angle-sensitive WDM filtering plate with operation wavelength in a band of 1610 nm, specifically in a range of 1596.3 nm-1602.3 nm, and the photo detector is an avalanche photodiode (APD) with an operation wavelength in a band of 1610 nm.

In some embodiments, the BOSA device may further comprise a base plate, and the laser, the built-in lens, the first focusing lens, the SOA, the first collimating lens, the first TEC temperature control module, and the second TEC temperature control module are all provided on the base plate.

In some embodiments, the laser is a semiconductor laser, the splitter is a 45° splitting plate, and the data upload and download port is a SC plug.

The present invention has the following advantages:

1. The present invention integrates wavelength-adjustable transmitting and wavelength-adjustable receiving functions, i.e., it realizes adjustable wavelength in two directions. In addition, it provides a diversity of functions such as data upload and download on the data upload and download port. So, the present invention can meet requirements of the TWDM-PON network;

2. All of the photoelectric elements used in the present invention such as the laser, the SOA, the TEC temperature control modules, the lenses, the filter and the like are of mature technologies, which facilitates fabrication, ensures stability and saves cost of the devices;

3. The photoelectric elements used in the present invention such as the laser, the SOA, the TEC temperature control modules, the lenses, the filter and the like have a small size and is easy to realize integration and miniaturization;

4. The present invention adjusts the transmitting wavelength of the laser by directly controlling the temperature thereof through the TEC temperature control module, which has a simple structure and principle and may easily implement the functions. The adjustment speed is fast, the stability is good, and the adjustable range is large and continuous, so that the number of channels may be easily upgraded and extended;

5. The present invention may control the gain of the SOA by controlling its bias current so as to adjust the optical output power, which is simple and reliable, and has a fast adjustment speed and a large adjustable range;

6. The present invention performs filtering by the filter and realizes adjustable filtering wavelength by changing an angle between the filter and the optical path, which has a simple structure, a small size, good filtering effect, a large range of wavelength adjustment, and a low cost. It may easily implement the multi-channel filtering function, and the number of channels may be easily upgraded and extended.

Figure 1:
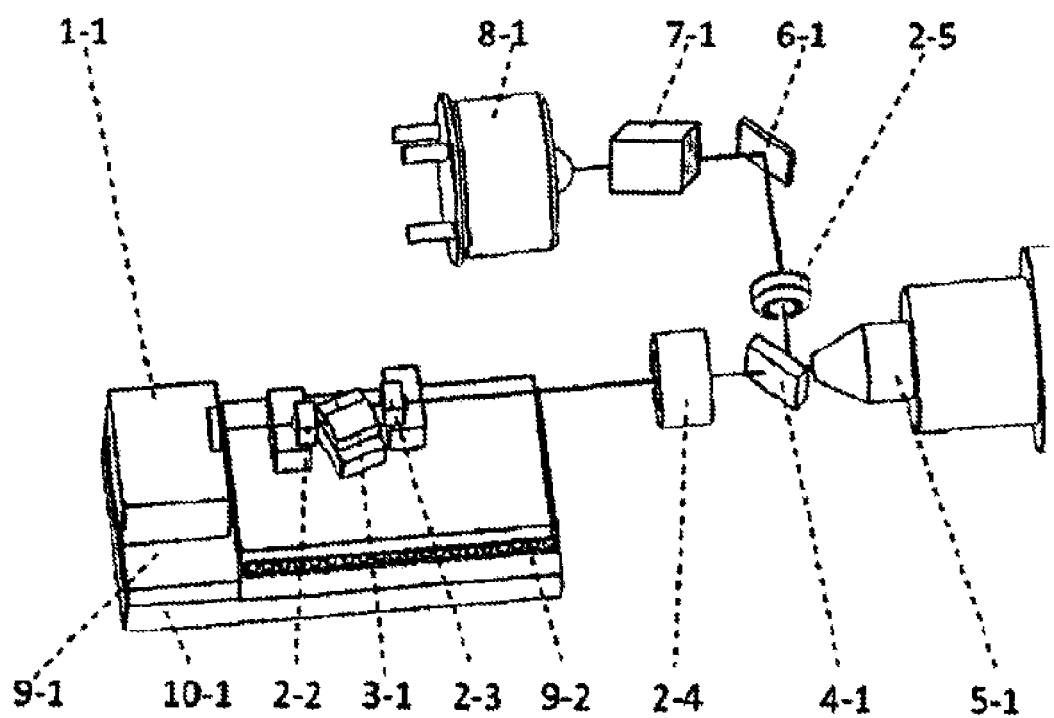
FIG. 1 is a structural schematic diagram showing a BOSA device having an adjustable wavelength in two directions according to an embodiment of the present invention.

REFERENCE NUMERALS 1-1: laser 2-1: built-in lens
2-2: first focusing lens 3-1: semiconductor optical amplifier (SOA)
2-3: first collimating lens 2-4: second focusing lens 4-1: splitter 5-1: data upload and download port
9-1: first TEC temperature control module
9-2: second TEC temperature control module
10-1: base plate 2-5: second collimating lens
6-1: mirror 7-1: filter
8-1: photo detector 11-1: micro-motor
12-1: rotary plate 13-1: MEMS chip

DETAILED DESCRIPTION

The present invention will be described in further detail with reference to the drawings and the embodiments.

Figure 2:
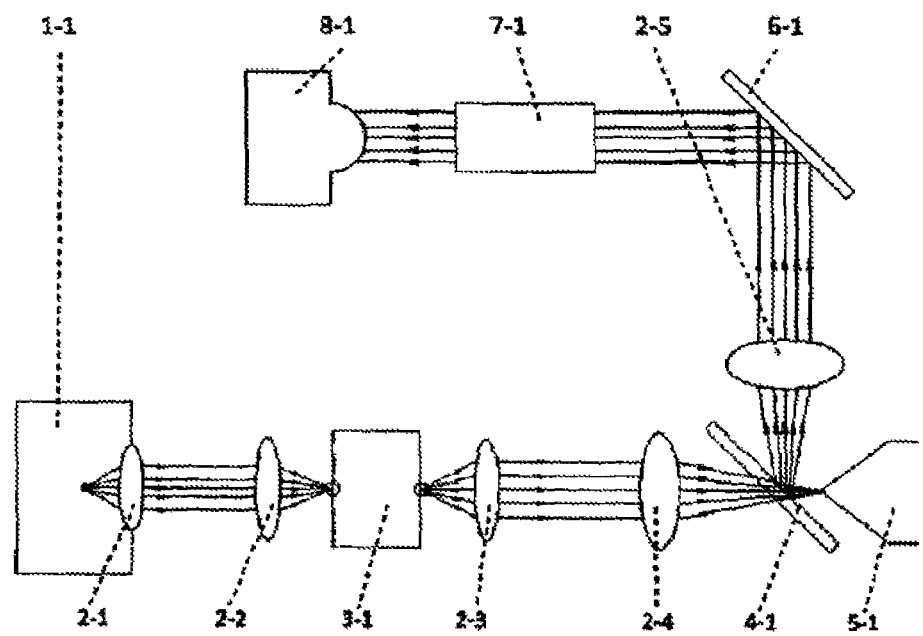
FIG. 2 is a schematic diagram showing an optical path of the BOSA device having an adjustable wavelength in two directions according to an embodiment of the present invention.

FIG. 1 is a schematic structure diagram showing a BOSA device having an adjustable wavelength in two directions according to an embodiment of the present invention. FIG. 2 is a schematic diagram showing an optical path of the BOSA device having an adjustable wavelength in two directions according to an embodiment of the present invention. As shown in FIG. 1 and FIG. 2, the BOSA device having an adjustable wavelength in two directions may comprise a signal transmitter section and a signal receiver section.

The signal transmitter section may sequentially include a laser 1-1, a built-in lens 2-1 to convert a divergent light from the laser 1-1 into a parallel light, a first focusing lens 2-2 to convert the parallel light into a convergent light, a semiconductor optical amplifier (SOA) 3-1 to amplify the convergent light incident thereon, a first collimating lens 2-3 to convert a divergent light from the SOA into a parallel light, a second focusing lens 2-4 to convert the parallel light into a convergent light, a splitter 4-1 to transmit the light from the laser side and to reflect a light from external network to an optical path of the receiving end, and a data upload and download port 5-1 to extract the optical signal from the transmitting end to the external network so as to realize signal upload and to introduce the signal from the external network into the receiving end so as to realize signal download, and the signal transmitter section may further include a first TEC temperature control module 9-1 to control temperature of the laser 1-1 so as to adjust an output wavelength thereof, and a transmitting end driving device.

The signal receiver section may sequentially include a second collimating lens 2-5 to convert a light, which is a multi-wavelength light downloaded from the external network, introduced through the data upload and download port 5 and then reflected by the splitter 4-1, into a parallel light, a mirror 6-1 to change transmission direction of the parallel light, a filter 7-1 to pass a desired single wavelength from the multi-wavelength light, and a photo detector 8-1 to convert the received optical signal into an electric signal for subsequent analysis and processing, and the signal receiver section may further include a receiving end driving device to rotate the filter 7-1 to change an angle between the filter 7-1 and the optical path so as to make the passing wavelength of the filter adjustable.

An embodiment of the present invention provides a BOSA device having an adjustable wavelength at both the receiving end and transmitting end including the laser 1-1, the SOA 3-1, the data upload and download port 5-1, the splitter 4-1, the first TEC temperature control module 9-2, the filter 7-1, the receiving end driving device as well as various lenses and relevant support and control components. At the transmitting end, the first TEC temperature control module 9-1 may control the temperature of the laser 1-1 to adjust the output wavelength of the laser 1-1, and at the receiving end, the receiving end driving device may drive the filter 7-1 to rotate to change an angle between the filter 7-1 and the optical path so as to realize an adjustable passing wavelength. The BOSA device of the present invention may be used to upload data to and download data from the network, and on the premise of ensuring signal quality, it may realize an adjustable wavelength of both the transmitting signal and the receiving signal and realize wavelength division multiplexing in the signal transmitting and receiving directions. As signal transmitting and receiving are integrated into one single device by suing the laser 1-1, the SOA 3-1, the splitter 4-1, the filter 7-1 and the like that are all of mature technologies, it has advantages such as powerful functions, easy adjustment, small size, high degree of integration, easy upgrade and extension, low cost and the like. Such a device has broad application prospects and it may improve performance of an entire network when it is used in the TWDM-PON network.

As shown in FIG. 1, the signal transmitting section may further include a second TEC temperature control module 9-2 to control temperature of the SOA 3-1 under a nominal temperature to ensure output stability.

In an embodiment, the transmitting end driving device may include a first driving control element to drive the laser 1-1 and a second driving control element to drive the SOA 3-1. The first driving control element may adjust magnitude of a bias current of the laser 1-1 to adjust an optical output power of the laser 1-1. The second driving control element may adjust magnitude of a bias current of the SOA 3-1 to adjust a gain of the SOA 3-1.

The signal transmitting section may include the laser 1-1, the SOA 3-1, the first TEC (thermo-electric cooler) temperature control module 9-1, the second TEC temperature control module 9-2, the splitter 4-1, various lenses, the data upload and download port 5-1 and relevant driving control components. The laser 1-1 may be a semiconductor laser, which may convert electric energy into optical energy to generate an optical signal when it is powered on, and the optical signal may be emitted through the built-in lens 2-1. The output wavelength may be adjusted by controlling the temperature of the laser 1-1, and the optical output power of the laser 1-1 may be adjusted by adjusting magnitude of the bias current of the laser 1-1. In the embodiment, the first TEC temperature control module 9-1 may be used to control the temperature of the laser 1-1 with a high precision of up to ±0.1° C. The first driving control element may adjust magnitude of the bias current of the laser 1-1 to adjust the optical output power of the laser 1-1. The laser 1-1 may emit light with a wavelength in a band of 1550 nm, specifically in a band from 1532.6 nm to 1538.2 nm. When the light from the laser 1-1 is coupled into the SOA 3-1 through the first focusing lens 2-2, the SOA 3-1 amplifies power of the light, and then the light is emitted through the first collimating lens 2-3 and matches to the subsequent optical path. The SOA 3-1 may operate with a wavelength in a band of 1550 nm, and it may adjust optical gain to obtain greater optical power and control optical output power. The gain may be adjusted by controlling the bias current of the SOA 3-1. In an embodiment, the second driving control element may control the bias current of the SOA 3-1 to adjust its gain. As the SOA 3-1 is made of semiconductor materials and its performance is very sensitive to temperature, for example, the operating efficiency of the SOA 3-1 may rapidly decline and thus the output power decrease when the temperature becomes too high, the second TEC temperature control module 9-2 is used to control the temperature of the SOA 3-1 so that it operates under a nominal temperature to ensure output stability and high control precision of up to ±0.1° C. Then, the optical signal may be focused by the second focusing lens 2-4 and then is incident on the splitter 4-1. In an embodiment, the splitter 4-1 may transmit light in the band of 1550 nm and reflect light in the band of 1610 nm. Then, the optical signal may enter into the data upload and download port 5-1 and transmit to the external network through the data upload and download port 5-1.

In the embodiment, the data upload and download port 5-1 may be a SC plug. A standard SC plug may provide a standard interface, which may be connected to an external patch cord to implement signal upload and download. Through the single interface, the optical signal from the transmitting end may be extracted to the external network to realize signal upload, and the signal from the external network may also be introduced into the receiving end of the device to realize signal download.

In an embodiment, various lenses are used to change propagation characteristics of the light beam, for example, to convert a divergent light into a parallel light or convert a parallel light into a convergent light as needed, so as to realize a higher coupling efficiency. The second focusing lens 2-4 may have a relatively long focal length so as to make a sufficient space for disposition of the splitter 4-1.

The signal receiving section may include a second collimating lens 2-5, a mirror 6-1, a filter 7-1, a photo detector 8-1, and various driving control and support components. The data upload and download port 5-1 may receive a multi-wavelength optical signal in a band of 1610 nm downloaded from the external network. As the operation wavelength of the receiving end is in the band of 1610 nm, and the splitter 4-1 transmits the light in the band of 1550 nm and reflects the light in the band of 1610 nm, the splitter 4-1 may reflect the multi-wavelength light and change its direction. Then, the optical signal, which is a divergent light, may be converted into a parallel light by the second collimating lens 2-5 so as to match application requirements of the filter 7-1 and the photo detector 8-1, thereby increasing the coupling efficiency. The mirror 6-1 may change transmission direction of the light to fit for a layout of the entire device, save space, and make the layout of the entire device more compact. Then, the optical signal may be filtered by the filter 7-1, and a desirable single wavelength in the multi-wavelength signal may pass through the filter 7-1. Then, the optical signal becomes a single wavelength signal, which may be received by the photo detector 8-1.

In the embodiment, the filter 7-1 may be a 100 G angle-sensitive WDM filtering plate operating with a wavelength in the band of 1610 nm, specifically in the band from 1596.3 nm to 1602.3 nm. As the filter 7-1 is placed in the optical path with a different angle, the passing wavelength becomes different, and the angle is in one-to-one correspondence to the passing wavelength of the filter. The WDM filtering plate has a small size, is easy to integrate, has a large filtering range, and is easy to upgrade and extend. The photo detector 8-1 may be an avalanche photodiode (APD), which may convert the received optical signal into an electric signal. As needed, the photo detector 8-1 may have a flexible package. The photo detector 8-1 may receive the optical signal passing through the filter 7-1 and convert it into a current signal with a certain intensity for subsequent signal transmission, analysis and processing. The photo detector 8-1 may operate with a wavelength in the band of 1610 nm.

The passing wavelength of the filter 7-1 may be adjusted in flexible and various ways. In an embodiment, as a mode 1, a micro-motor 11-1 may rotate the filter 7-1 to change its angle with respect to the optical path so as to realize adjustment of the passing wavelength. In another embodiment, as a mode 2, a MEMS chip 13-1 may rotate the filter 7-1 to change its angle with respect to the optical path so as to realize adjustment of the passing wavelength.

Figure 4:
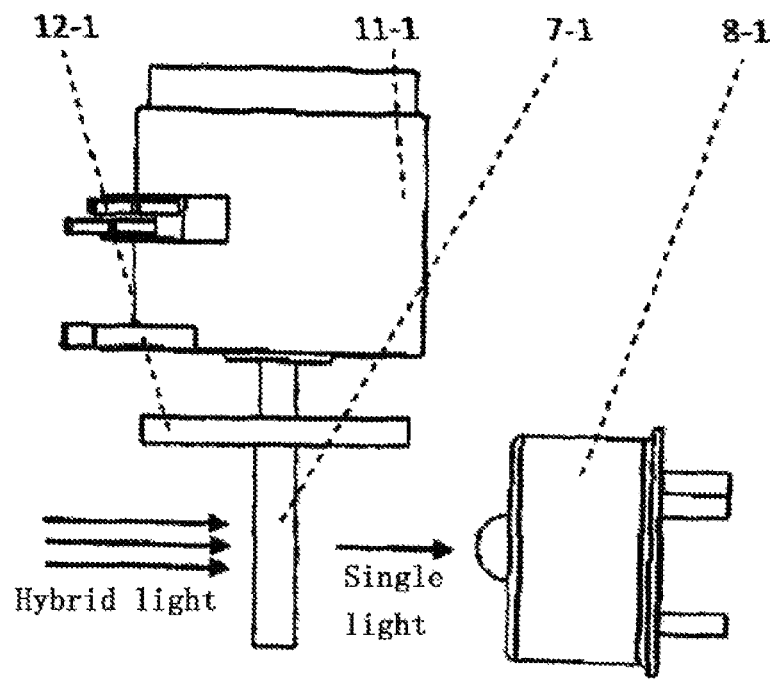
FIG. 4 is a schematic structure diagram showing a micro-motor rotating a filter.

As for the mode 1, referring to FIG. 4, the receiving end driving device may include a micro-motor 11-1 and a rotary plate 12-1. A center of the rotary plate 12-1 may be connected to a shaft of the micro-motor 11-1, and the filter 7-1 may be bonded to the rotary plate 12-1. When the shaft of the micro-motor 11-1 rotates, the rotary plate 12-1 and the filter 7-1 bonded thereon are also rotated. Model and filtering properties of the filter 7-1 may be selected as needed. In an embodiment, a 100 G angle-sensitive WDM filtering plate may be used, which may operate with a wavelength in a band of 1610 nm, specifically in a band from 1596.3 nm to 1602.3 nm. Currently, in most optical networks, the optical signal downloaded from the network is in the band of 1610 nm, which is often a hybrid light having 8 wavelengths: 1596.34 nm, 1597.19 nm, 1598.04 nm, 1598.89 nm, 1597.75 nm, 1600.60 nm, 1601.46 nm, 1602.31 nm. When the hybrid light comes to the filter 7-1, the micro-motor 11-1 rotates and thus the rotary plate 12-1 and the filter 7-1 bonded thereon are rotated to a preset angle so that the desirable wavelength may pass through the filter 7-1, which is a single wavelength light and may be received by the photo detector 8-1.

Figure 5:
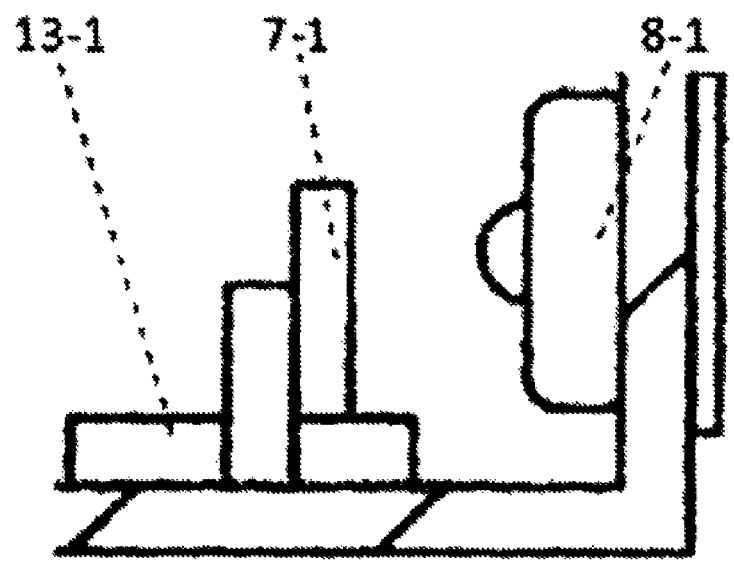
FIG. 5 is a schematic structure diagram showing a MEMS chip rotating a filter.

As for the mode 2, referring to FIG. 5, the receiving end driving device may include a MEMS chip 13-1, which has a rotary pole bonded to the filter 7-1. When the MEMS chip 13-1 is driven, it drives the filter 7-1 to rotate so as to change an angle between the filter 7-1 and the optical path and thus adjust the passing wavelength of the filter.

As shown in FIG. 1, the BOSA device may further include a base plate 10-1, on which the laser 1-1, the built-in lens 2-1, the first focusing lens 2-2, the SOA 3-1, the first collimating lens 2-3, the first TEC temperature control module 9-1, and the second TEC temperature control module 9-2 are all provided.

Figure 3:
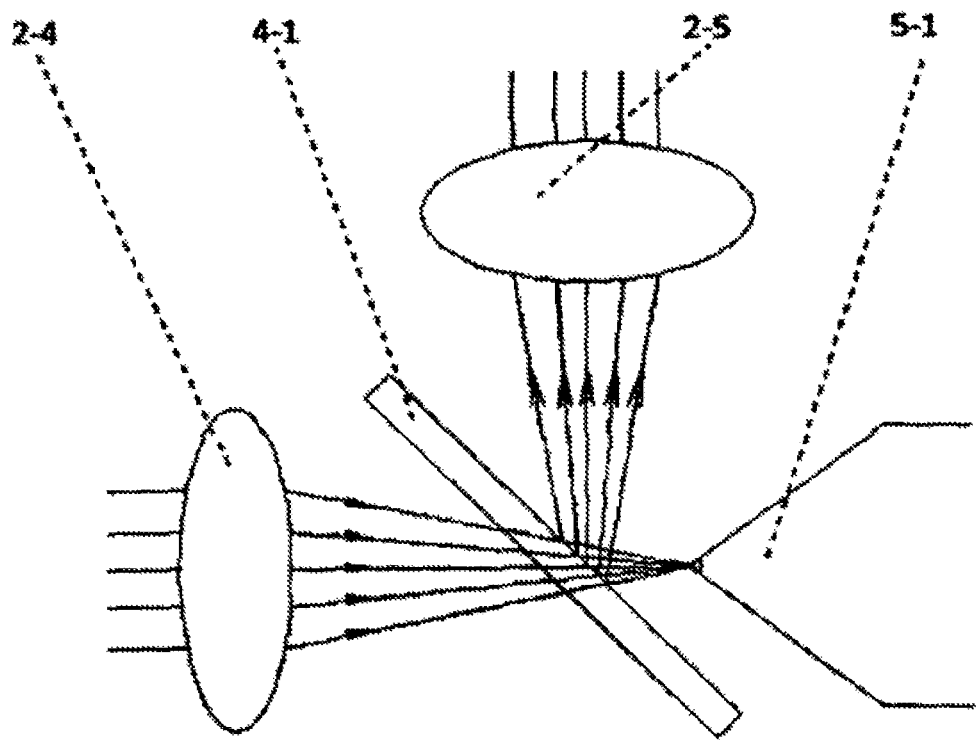
FIG. 3 is a schematic diagram showing a beam splitting optical path of a 45° splitter.

As shown in FIG. 3, in an embodiment, the splitter 4-1 may be a 45° splitting plate placed with an angle of 45° with respect to the optical path to split lights with different wavelengths in two opposite directions into two beams that propagate in directions perpendicular to each other. The 45° splitting plate may transmit light in the band of 1550 nm and reflect light in the band of 1610 nm. The optical signal at the transmitting end and the optical signal at the receiving end have different wavelengths, and both of them are connected with the external network through the data upload and download port 5-1. The light of the band 1550 nm emitted from the laser 1-1 at the transmitting end, as indicated by a solid arrow, passes through the 45° splitting plate and is coupled into the data upload and download port 5-1, and then enters the external network through the data upload and download port 5-1. The optical signal of the band 1610 nm coming from the external network, as indicated by a hollow arrow, enters into the device through the data upload and download port 5-1, is reflected by the 45° splitting plate to changes its propagation direction, and finally is received by the photo detector 8-1.

In the embodiment, various photoelectric components such as the laser 1-1, the SOA 3-1, the photo detector 8-1 and the like have respective requirements on the propagation state of the light. Some of them match with a divergent beam or a convergent beam, and some of them match a parallel beam. In the optical system of the present invention, many lenses are used to change the propagation state of the beam so as to match with the properties of respective photoelectric components and obtain a higher coupling efficiency. FIG. 2 is a schematic diagram showing the optical path propagation of the entire device. As shown in FIG. 2, the transmitting optical path may be as follows: the light emitted from the laser 1-1 is a divergent light, which passes through the built-in lens 2-1 and is converted into a parallel light, and then the light is focused by the first focusing lens 2-2 and becomes a convergent light, which is coupled into an incident port of the SOA 3-1, amplified by the SOA 3-1, and emitted through an output port of the SOA 3-1. At this point, the light is converted into a divergent beam. The divergent beam may be converted into a parallel beam by the first collimating lens 2-3, and then be converted into a convergent beam through the second focusing lens 2-4, which may pass through the splitter 4-1 (the splitter does not change the propagation state of the light) and be coupled into the data upload and download port 5-1 where it is uploaded to the external network. The receiving optical path may be as follows: the optical signal downloaded from the external network is emitted as a divergent light from the data upload and download port 5-1, reflected by the splitter 4-1 to change its propagation direction, and then is converted into a parallel light through the second collimating lens 2-5, the parallel light is reflected by the mirror 6-1 to change its propagation direction, filtered by the filter 7-1 to become a single wavelength light, which is received by the photo detector 8-1.

Currently, in most optical networks, the upload optical signal has wavelengths in the band of 1550 nm, in which 8 wavelengths are often used: 1538.186 nm, 1537.397 nm, 1536.609 nm, 1535.822 nm, 1535.036 nm, 1534.250 nm, 1533.465 nm, 1532.681 nm. The SOA 3-1 and the second TEC temperature control module 9-2 are closely attached to each other, and the second TEC temperature control module 9-2 may be used to control the temperature of the SOA 3-1 to make sure that it operates under a nominal temperature. Then, the optical paths may be coupled. The SOA 3-1, the first focusing lens 2-2, and the first collimating lens 2-3 may be coupled respectively, and they are fixed on the base plate 10-1. Then, the optical paths of the laser 1-1 and the SOA 3-1 are coupled, and the laser 1-1 is fixed on a housing so that the light emitted from the laser 1-1 enters into the SOA 3-1 through the first focusing lens 2-2 and then is emitted through the first collimating lens 2-3. The splitter 4-1 may be positioned between the second focusing lens 2-4 and the data upload and download port 5-1 forming an angle of 45° with respect to the optical path. The light emitted from the first collimating lens 2-3 is adjusted by the second focusing lens 2-4 and then is coupled into the data upload and download port 5-1 after passing through the splitter 4-1. Then, the data upload and download port 5-1, the second focusing lens 2-4, the splitter 4-1 may be fixed on the housing. At this point, the transmitter section of the device is completed.

As to the receiver section, the optical paths may be coupled firstly. The light emitted from the data upload and download port 5-1 is reflected by the splitter 4-1 to change its propagation direction by 90°, and the second collimating lens 2-5 may be coupled and then fixed on the housing. Then, the mirror 6-1 may be fixed to deflect the optical path by 90°. Then, the photo detector 8-1 is coupled with and aligned to the reflected light and the photo detector 8-1 is fixed on the housing. Then, the filter 7-1 is interposed into the optical path between the photo detector 8-1 and the mirror 6-1, and it is coupled and fixed. At this point, the receiver section of the device is completed.

Although the present invention has been shown and described in detail with reference to a related specific embodiment, it will be understood by those skilled in the art that various changes in form and details may be made therein without departing from the spirit and scope of the invention. Such variations will fall within the protection scope defined by the claims and its equivalents.

What is claimed is:

1. A BOSA device having an adjustable wavelength in two directions characterized in comprising a signal transmitter section and a signal receiver section,
    wherein the signal transmitter section sequentially includes a laser, a semiconductor optical amplifier (SOA) configured to amplify a light emitted from the laser, a splitter configured to transmit the light from the laser side and to reflect a light from an external network to an optical path of the receiving end, and a data upload and download port configured to extract the optical signal from the transmitting end to the external network so as to realize signal upload and to introduce the signal from the external network into the receiving end so as to realize signal download, and the signal transmitter section further includes a first TEC temperature control module configured to control temperature of the laser so as to adjust an output wavelength of the laser, and a transmitting end driving device including a first driving control element configured to drive the laser and a second driving control element configured to drive the SOA, the first driving control element adjusts magnitude of a bias current for the laser so as to adjust optical output power of the laser, and the second driving control element adjusts magnitude of a bias current for the SOA so as to adjust a gain of the SOA,
    wherein the signal receiver section sequentially includes a filter configured to select a wavelength from the optical signal introduced from the external network into the receiving end, and a photo detector configured to convert the received optical signal into an electric signal for subsequent analysis and processing, and the signal receiver section further includes a receiving end driving device configured to drive the filter so as to make a passing wavelength of the filter adjustable, and
    wherein the signal receiver section further sequentially includes a second collimating lens located between the splitter and the filter to convert a divergent multi-wavelength light downloaded from the external network reflected by the splitter into a parallel light, and a mirror to change a direction of the parallel light.

2. The BOSA device having an adjustable wavelength in two directions of claim 1, characterized in that the signal transmitter section further sequentially includes a built-in lens to convert a divergent light from the laser into a parallel light and a first focusing lens to convert the parallel light into a convergent light located between the laser and the SOA, and a first collimating lens to convert a divergent light from the SOA into a parallel light and a second focusing lens to convert the parallel light into a convergent light located between the SOA and the splitter.

3. The BOSA device having an adjustable wavelength in two directions of claim 2, characterized in that the signal transmitter section further includes a second TEC temperature control module configured to control temperature of the SOA under a nominal temperature to ensure output stability.

4. The BOSA device having an adjustable wavelength in two directions of claim 1, characterized in that the receiving end driving device includes a micro-motor and a rotary plate connected at its center to a shaft of the micro-motor, the filter is coupled and bonded on the rotary plate so that when the shaft of the micro-motor rotates, the rotary plate and the filter bonded thereon also rotate.

5. The BOSA device having an adjustable wavelength in two directions of claim 1, characterized in that the receiving end driving device includes a MEMS chip having a rotary pole bonded to the filter so that when the MEMS chip is driven, the rotary pole rotates the filter.

6. The BOSA device having an adjustable wavelength in two directions of claim 1, characterized in that the laser provides an output light in a band of 1550 nm, the SOA has an operation wavelength in the band of 1550 nm, and the splitter transmits light in the band of 1550 nm and reflects light in a band of 1610 nm.

7. The BOSA device having an adjustable wavelength in two directions of claim 1, characterized in that the filter is a 100G angle-sensitive WDM filtering plate with an operation wavelength in a band of 1610 nm, specifically in a band of 1596.3 nm - 1602.3 nm, and the photo detector is an avalanche photodiode (APD) with an operation wavelength in the band of 1610 nm.

8. The BOSA device having an adjustable wavelength in two directions of claim 3, characterized in that the BOSA device further comprises a base plate, and the laser, the built-in lens, the first focusing lens, the SOA, the first collimating lens, the first TEC temperature control module, and the second TEC temperature control module are all provided on the base plate.

9. The BOSA device having an adjustable wavelength in two directions of claim 1, characterized in that the laser is a semiconductor laser, the splitter is a 45° splitting plate, and the data upload and download port is a SC plug.

\* \* \* \* \*